John Crossland. Corn Harvester.
117264     Fig. 1.     PATENTED JUL 25 1871
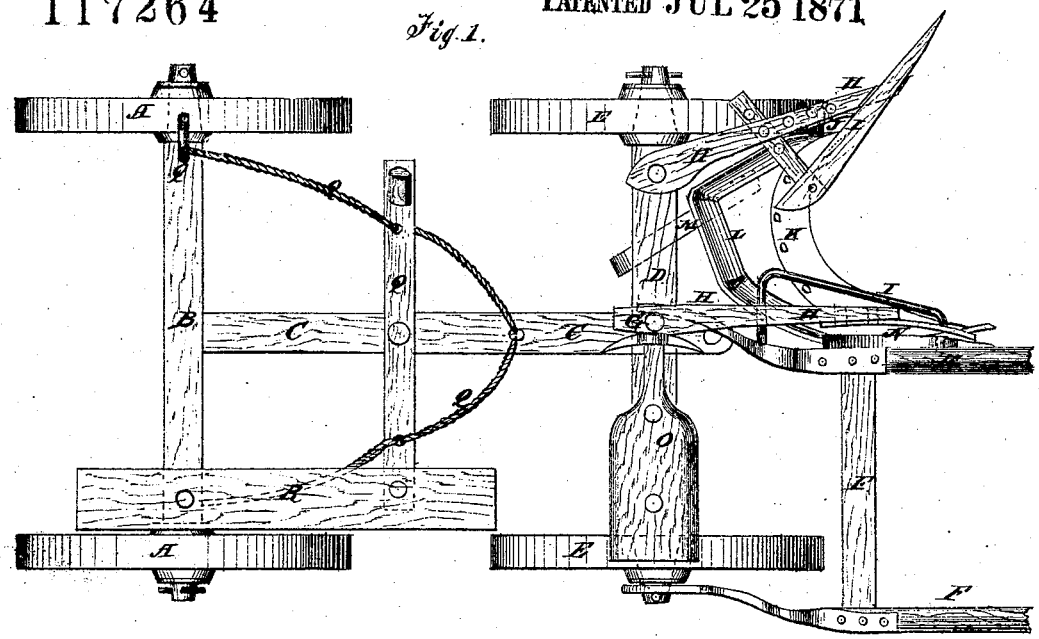
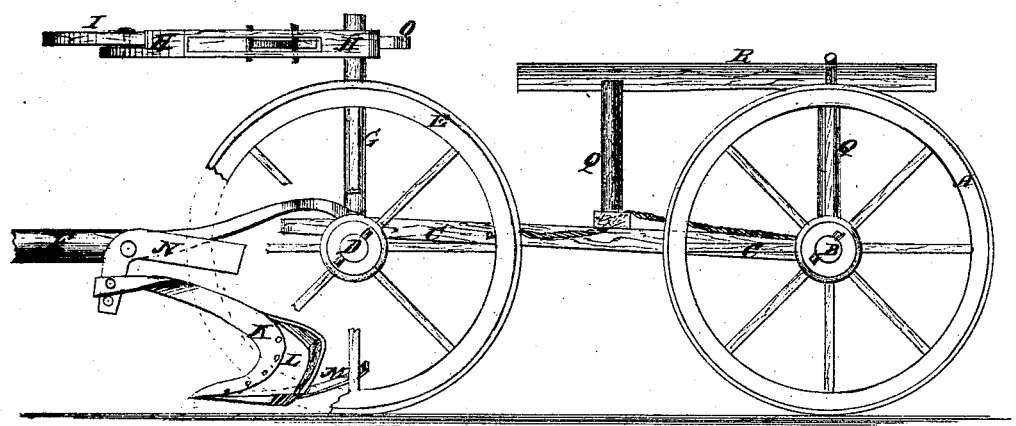
Fig. 2.
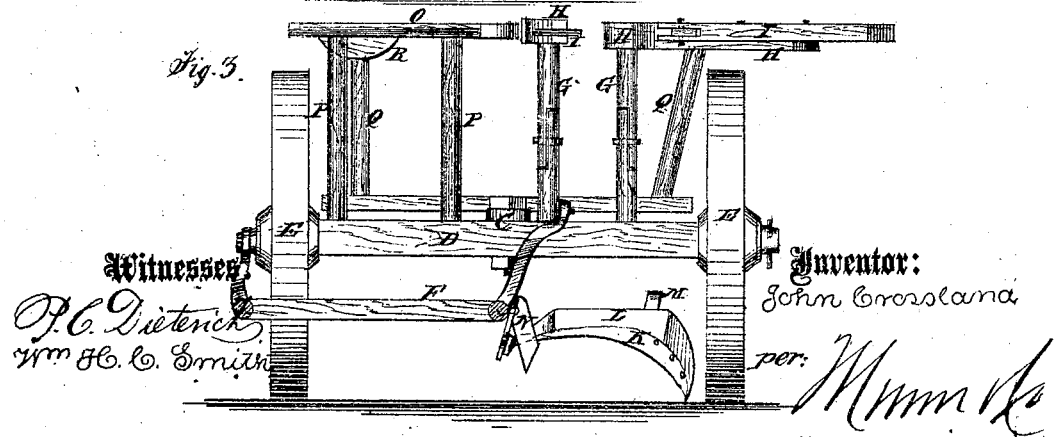
Fig. 3.
Witnesses:
P. C. Dieterich
Wm. H. C. Smith
Inventor:
John Crossland
per: Wm H&c
Attorneys.

UNITED STATES PATENT OFFICE.

JOHN CROSSLAND, OF SPENCER GROVE, IOWA.

IMPROVEMENT IN CORN-HARVESTERS.

Specification forming part of Letters Patent No. 117,264, dated July 25, 1871.

*To all whom it may concern:*

Be it known that I, JOHN CROSSLAND, of Spencer Grove, in the county of Benton and State of Iowa, have invented a new and useful Improvement in Corn-Harvester; and I do hereby declare that the following is a full, clear, and exact description thereof, which will enable others skilled in the art to make and use the same, reference being had to the accompanying drawing forming part of this specification, in which—

Figure 1 is a top view of my improved corn-harvester. Fig. 2 is a side view of the same, part being broken away to show the construction. Fig. 3 is a front view of the same.

Similar letters of reference indicate corresponding parts.

My invention has for its object to furnish an improved machine for cutting corn standing in the field, and which shall be simple in construction, convenient in use, and effective in operation; and it consists in the construction and combination of the various parts of the machine, as hereinafter more fully described.

A are the rear wheels; B is the rear axle; C is the reach, the forward end of which is pivoted to the center of the forward axle D, upon the journals of which the forward wheels E work. F are the thills, which are attached to the forward axle D at the right of the center of said axle D, so that the horse can walk between the rows of corn. To the left-hand part of the forward axle D are attached two posts, G, at a little distance apart. The posts G are made in two parts, halved to each other, and secured by a pin or bolt, several holes being made for said pin or bolt, so that the posts may be conveniently lengthened or shortened, as the height of the corn-stalks may require. To the upper ends of the posts G are attached arms H, which extend forward and incline from each other. With the forward parts of the arms H are connected other arms I, which are set at a greater inclination than the arms H, and the rear ends of which are held toward each other by springs J. The rear ends of the arms I have arms formed upon or attached to them, which pass through slots in the middle parts of the arms H to support and guide the said arms I in their movements, and to support the upper end of the stalks during the cutting operation and after being off. The arms H I are designed to collect and support the upper parts of the stalks. The joints in the posts G enable the forward ends of the arms H I to be inclined downward to collect the stalks when bent or inclined to one side or downward. K is the cutter, which is curved, as shown in Figs. 1, 2, and 3, and to its rear edge is attached a pan, L, or plate, with an upwardly-projecting flange around its end and rear edges. M is a shoe, attached to the outer part of the under side of the cutter K L, to carry the said cutter as the machine is drawn forward. The inner end of the curved cutter K is extended forward, and is pivoted to the shorter arm of the right-angled lever N, which is pivoted at its angle to the side of the thills F. The longer and heavier arm of the lever N projects to the rearward, and, by its weight, when the cutter is not working, holds the edge of said cutter away from the ground. As the cutter K is drawn against the corn-stalks the resistance raises the heavier arm of the lever N, allowing the edge of the cutter to drop a little, and causing it to cut off the stalks more easily. The cutter K is so arranged as to begin to act upon the stalks just as their upper ends have passed the rear ends of the spring-arms I. As the stalks are cut off their butts pass upon and are supported by the pan L, being kept in an erect position by the forward axle D, arms H, and shouldered rear ends of the spring-arms I. When a sufficient amount of stalks has been thus cut and collected, (the operator sitting upon the seat O supported by the standard P, attached to the forward axle D,) they are deposited in the rack or box Q attached to the rear axle B and reach C, from which they may be removed, when a sufficient quantity has been collected to form a shock, by an operator sitting upon a seat, R, attached to and supported by one side of said rack or box Q, and deposited upon the ground. Or, if desired, the corn may be carried in the rack or box Q to any desired place before unloading it.

Having thus described my invention, I claim as new and desire to secure by Letters Patent—

1. The arms H I, springs J, and jointed posts G, combined, as described, to enable the stalks to be gathered, substantially as specified.

2. The cutter K, combined with the weighted lever N, for the purpose specified.

3. The automatically-adjusting knife K, bined with weighted lever N and shoe M, as and for the purpose specified.

JOHN CROSSLAND.

Witnesses:
JACOB W. MYERS,
DAVID B. SANFORD.